United States Patent
Snowdon et al.

(10) Patent No.: US 12,278,696 B2
(45) Date of Patent: Apr. 15, 2025

(54) TIME OFFSET DETERMINATION WITHOUT SYNCHRONIZATION

(71) Applicant: Arista Networks, Inc., Santa Clara, CA (US)

(72) Inventors: David C. A. Snowdon, Sydney (AU); David J. Mirabito, Camperdown (AU)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/314,347

(22) Filed: May 9, 2023

(65) Prior Publication Data
US 2023/0275680 A1    Aug. 31, 2023

Related U.S. Application Data

(63) Continuation of application No. 17/211,091, filed on Mar. 24, 2021, now Pat. No. 11,683,111.

(51) Int. Cl.
*H04J 3/06* (2006.01)
*H04L 7/00* (2006.01)

(52) U.S. Cl.
CPC .......... *H04J 3/0661* (2013.01); *H04L 7/0054* (2013.01)

(58) Field of Classification Search
CPC .............................. H04J 3/0661; H04L 7/0054
See application file for complete search history.

(56) References Cited

U.S. PATENT DOCUMENTS

| | | | |
|---|---|---|---|
| 7,565,696 | B1 | 7/2009 | Njemanze |
| 10,841,885 | B2 | 11/2020 | Yau et al. |
| 11,197,075 | B1 | 12/2021 | Kamen et al. |
| 11,216,466 | B2 | 1/2022 | Yang et al. |
| 11,281,250 | B2* | 3/2022 | Horn ................. G06F 1/04 |
| 2020/0343988 | A1* | 10/2020 | Nandiraju ........ H04J 3/0661 |
| 2023/0072580 | A1* | 3/2023 | Van Hecke ........ G06F 1/12 |

* cited by examiner

*Primary Examiner* — Chandrahas B Patel
(74) *Attorney, Agent, or Firm* — Tianyi He

(57) ABSTRACT

A method and system for the post-adjustment (i.e., offline) of event timestamps to implement virtual time synchronization amongst detection node clocks. In existing methodologies with the goal of clock synchronization, clocks (and timestamps generated therefrom) are disciplined or adjusted at the recordation time of the events on a detection node (e.g., a switch/router, an Internet-of-Things (IoT) device, a wireless sensor, etc.). However, there is no particular reason for these clocks or timestamps to be accurate during the recordation time, but rather, should be accurate at their use or interpretation time. Further, through these recordation time adjustments, clock drifts and timing errors may be gradually introduced, leading to runaway inaccuracies. The disclosed method and system intentionally avoids the disciplining of clocks at event recordation times on the detection node and, instead, adjusts timestamps during interpretation times, to overcome the aforementioned issues.

20 Claims, 8 Drawing Sheets

TIME OFFSET DETERMINATION WITHOUT SYNCHRONIZATION

This application is a continuation of U.S. patent application Ser. No. 17/211,091, filed on Mar. 24, 2021, which is hereby incorporated by reference herein in its entirety.

BACKGROUND

Devices within and/or operatively connected to a network can benefit from time synchronization. In existing methodologies with the goal of clock synchronization, clocks (and timestamps generated therefrom) are disciplined or adjusted at the recordation time of the events by any given device. However, through these recordation time adjustments, clock drifts and timing errors may be gradually introduced, leading to runaway inaccuracies.

DETAILED DESCRIPTION

Specific embodiments will now be described with reference to the accompanying figures.

In general, embodiments of the disclosure relate to a method and system for the post-adjustment (i.e., offline) of event timestamps to implement virtual time synchronization amongst detection node clocks. In existing methodologies with the goal of clock synchronization, clocks (and timestamps generated therefrom) are disciplined or adjusted at the recordation time of the events on a detection node (e.g., a switch/router, an Internet-of-Things (IoT) device, a wireless sensor, etc.). However, there is no particular reason for these clocks or timestamps to be accurate during the recordation time, but rather, should be accurate at their use or interpretation time. Further, through these recordation time adjustments, clock drifts and timing errors may be gradually introduced, leading to runaway inaccuracies. The disclosed method and system intentionally avoids the disciplining of clocks at event recordation times on the detection node and, instead, adjusts timestamps during interpretation times, to overcome the aforementioned issues.

Figure 1:
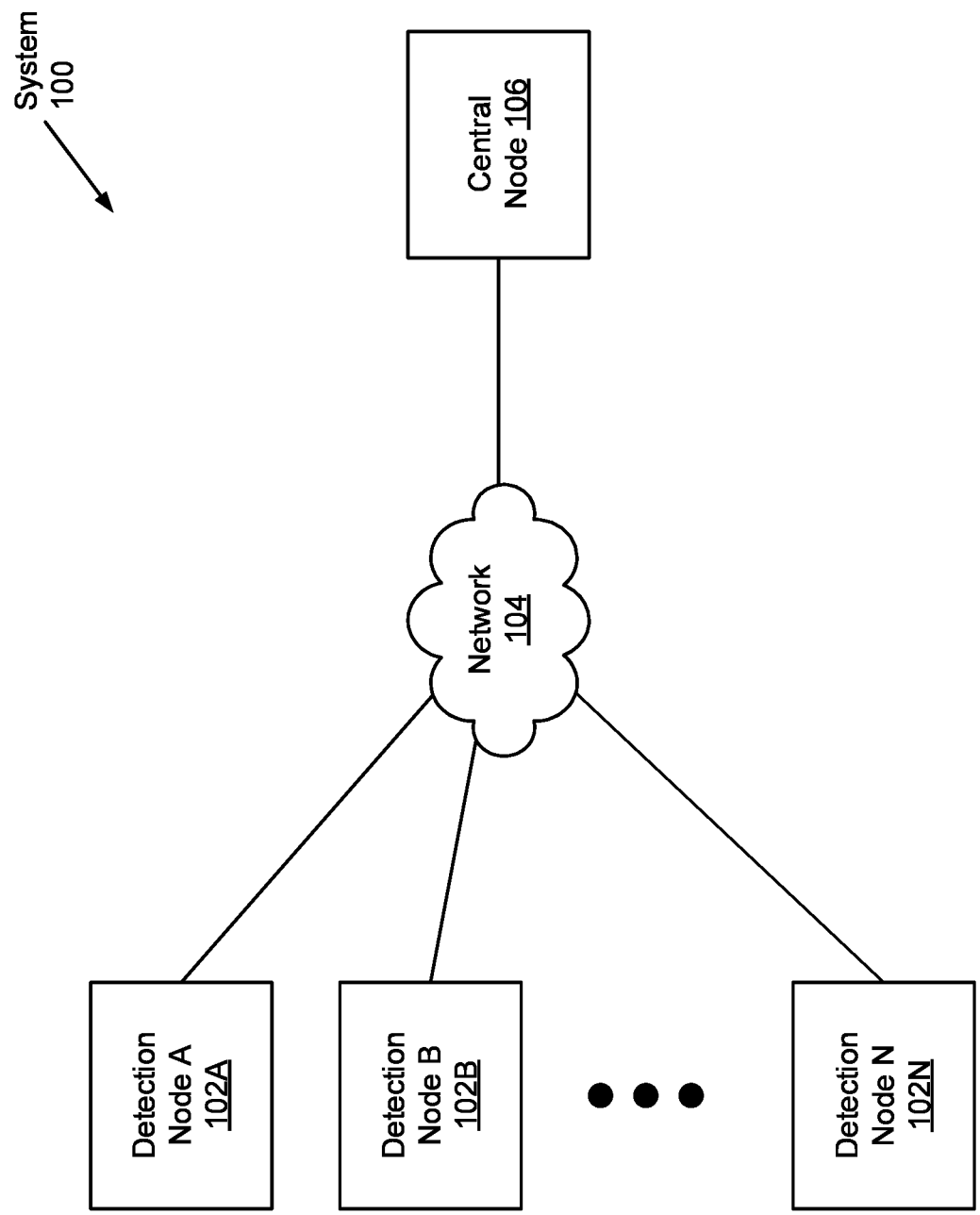
FIG. 1 shows a system in accordance with one or more embodiments of the disclosure.

FIG. 1 shows a system in accordance with one or more embodiments of the disclosure. The system (100) may include a collection of detection nodes (102A-102N) (also referred to herein as a network of detection nodes)—each of which may operatively connect to a central node (106) through a network (104). Further, any given detection node (102A-102N) may also operatively connect, via the network (104), to any subset of the other (or remaining) detection node(s) (102A-102N) in the aforementioned collection. Each other detection node (102A-102N), to which a given detection node (102A-102N) operatively connects, may also be referred to hereinafter as a neighbor detection node (102A-102N) of the given detection node (102A-102N). Each of these system (100) components is described below.

In one embodiment of the disclosure, a detection node (102A-102N) may represent any computing device capable of detecting events (described below) transpiring on the detection node (102A-102N) or within an environment outside, yet spatially proximal to, the detection node (102A-102N). To that extent, a detection node (102A-102N) may include hardware and/or logical subcomponents, such as hardware and/or logical sensors, which may enable the detection node (102A-102N) to detect said events. A computing device, in turn, may refer to any physical device capable of electronically processing instructions, and may include, but is not limited to, any of the following: one or more computer processors (e.g., components that include integrated circuitry) (not shown), memory (e.g., random access memory (RAM) (not shown)), input and output device(s) (not shown), persistent storage, one or more physical interfaces (e.g., network ports) (not shown), any number of other hardware components (not shown), and/or any combination thereof. Examples of a detection node (102A-102N) may include, but are not limited to, a network device (e.g., switch, router, multilayer switch, etc.) such as that described below, an IoT device (e.g., connected appliance, smart home system, wearable health monitor, etc.), a wireless sensor (e.g., single-board computer, embedded sensor module, etc.), or any other type of computing device with the aforementioned requirements.

In one embodiment of the disclosure, an event may encompass any occurrence that a detection node (102A-102N) may be configured to detect. As mentioned above, an event may transpire on a detection node (102A-102N) or, alternatively, may transpire within an environment outside, yet spatially proximal to, a detection node (102A-102N). Examples of the former may include, but are not limited to, the arrival of network traffic data through any physical interface of a detection node (102A-102N), the arrival of a time pulse or pulse per second (PPS) signal through any physical interface of a detection node (102A-102N), the generation of log messages arising from software processes (e.g., error conditions, user logins, etc.) occurring on a detection node (102A-102N), the arrival or departure of clock synchronization samples through any physical interface of a detection node (102A-102N), the reading of counters (e.g., for packet classification) occurring on a detection node (102A-102N), the recording of configuration updates applied to a detection node (102A-102N), and the recording of on-board telemetry information (e.g., fan speed, temperatures, etc.) describing a state of a detection node (102A-102N). On the other hand, examples of the latter may include, but are not limited to, the change in any monitored property (e.g., temperature, pressure, luminosity, etc.) reflective of the outside environment from hardware sensors connected to a detection node (102A-102N).

In one embodiment of the disclosure, as discussed above, one type of a computing device as described herein is a network device. A network device may refer to a physical device that includes and/or operatively connects to persistent storage (not shown), memory (e.g., random access memory (RAM)) (not shown), one or more processor(s) (e.g., integrated circuits) (not shown), and at least one physical network interface (not shown). Examples of a network device include, but are not limited to, a network switch, a router, a multilayer switch, a fibre channel device, an Infini-Band® device, etc. A network device is not limited to the aforementioned specific examples.

In one embodiment of the disclosure, a network device also includes any number of additional components (not shown), such as, for example, network chips, field programmable gate arrays (FPGAs) (not shown), application specific integrated circuits (ASICs) (not shown), indicator lights (not shown), fans (not shown), clocks (not shown) etc.

In one embodiment of the disclosure, a network device includes any software configured to perform various functions of the network device. Such software may, for example, execute using one or more processors (including circuitry therein) of a network device, or any other hardware resource of a network device capable of executing software. One example of such software is an operating system (OS) (not shown). An OS includes any software and/or firmware for managing the resources (e.g., hardware, other software, etc.) of one or more network devices.

More specifically, an OS may be a program or set of programs that manages all or any portion of the other software (e.g., applications, agents, etc.) in a network device, as well as all or any portion of the hardware of a network device. Management by an OS may include scheduling, hardware allocation, application execution, network access, management of access to stored files that are selectively made available to applications running on the OS, etc. An OS may also manage and enforce settings and permissions customized for specific applications running within the OS.

In one embodiment of the disclosure, a network device includes functionality to send and/or receive packets (or other network traffic data, such as, e.g., frames, etc.) at any of the physical network interfaces (i.e., ports) of the network device and to process the packets. Processing a packet may include, but is not limited to, a series of one or more table lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Such a series of lookups and corresponding actions may be referred to as a pipeline, and may be, for example, programmed as a match-action pipeline. Examples of pipeline processing include, but are not limited to, performing a lookup to determine: (i) whether to take a security action (e.g., drop the network traffic data unit); (ii) whether to mirror the network traffic data unit; and/or (iii) how to route/forward the packet in order to transmit the packet from an interface of the network device.

In one embodiment of the disclosure, the network device is part of a network (104). The network (104) may refer to an entire network or any portion thereof (e.g., a logical portion of the devices within a topology of devices). The network (104) may include a datacenter network, a wide area network, a local area network, a wireless network, a cellular phone network, or any other suitable network that facilitates the exchange of information from one part of the network to another. A network may be located at a single physical location, or be distributed at any number of physical sites. Further, the network (104) may be coupled with or overlap, at least in part, with the Internet.

In one embodiment of the disclosure, the persistent storage (which may be or may include non-volatile storage device(s)) and/or memory (which may be or may include volatile storage device(s)) of a detection node (102A-102N) may be or include one or more data repositories for storing any number of data structures storing any amount of data (i.e., information). A data repository may refer to any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one embodiment of the disclosure, the persistent storage and/or memory of a detection node (102A-102N) may be considered, in whole or in part, as non-transitory computer readable mediums storing, at least in part, software and/or firmware.

Such software and/or firmware may include instructions which, when executed by the one or more processors (not shown) or other hardware (e.g. circuitry) of a detection node (102A-102N), cause the one or more processors and/or other hardware components to perform operations in accordance with one or more embodiments described herein. These operations may at least include the methods outlined in FIGS. 5 and 6, below, which are directed to logging events and logging offset observations, respectively.

Such software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one embodiment of the disclosure, any given detection node (102A-102N) may include functionality to exchange messages, relevant to time synchronization and/or clock offset determination, with each neighbor detection node of an associated set of neighbor detection nodes, or any subset thereof. With respect to a given detection node (102A-102N), a neighbor detection node may refer to another detection node (102A-102N) in the collection or network of detection nodes, which, for example: may be a specified number of hops (e.g., one or two hops) away from the given detection node (102A-102N) across the network (104); may be physically located within a specified distance threshold (e.g., one foot or one mile) from a location where the given detection node (102A-102N) physically resides; or may be assigned (or designated) as a neighbor detection node of the given detection node (102A-102N) by a network designer and/or administrator. One of ordinary skill will appreciate that any detection node (102A-102N) may be identified as a neighbor detection node for any other detection node (102A-102N) based on additional or alternative criteria without departing from the scope of the disclosure.

Existing methods of time synchronization and/or clock offset determination, which may be exercised amongst a given detection node (102A-102N) and their respective neighbor detection node(s), include the use of time protocols, such as the Precision Time Protocol (PTP) or the Network Time Protocol (NTP). Generally, these time protocols operate using message exchange schemes where the devices ping each other over a real connection, and go through a message exchange process to estimate delay(s) (or offsets) between clock devices on the devices. Details describing the message exchange process of these time protocols are outside the scope of the disclosure, and henceforth, will not be elaborated on herein. Furthermore, one of ordinary skill will appreciate that any given detection node (102A-102N) and their respective neighbor detection node(s) may exercise any other time protocol in which messages may be exchanged for the purpose of time synchronization in order to determine offsets between their respective clock devices.

Detection nodes (102A-102N) are described in further detail with respect to FIG. 2, below.

In one embodiment of the disclosure, the central node (106) may represent any computing device (described above) capable of overseeing (i.e., managing), as well as aggregating (i.e., consolidating) records (see e.g., FIGS. 4A and 4B) from, the collection or network of detection nodes (102A-102N). Examples of the central node (106) may include, but are not limited to, a server (e.g., a blade-server in a blade-server chassis, a rack server in a rack, etc.), a desktop computer, a mobile device (e.g., laptop computer, smart phone, personal digital assistant, tablet computer, and/or any other mobile computing device), a network device such as that described above, a virtual machine executing on and using underlying hardware components of a physical computing device, a wireless base station, or any other type of computing device with the aforementioned requirements.

In one embodiment of the disclosure, the persistent storage (which may be or may include non-volatile storage device(s)) and/or memory (which may be or may include volatile storage device(s)) of the central node (106) may be or include one or more data repositories for storing any number of data structures storing any amount of data (i.e., information). A data repository may refer to any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one embodiment of the disclosure, the persistent storage and/or memory of the central node (106) may be considered, in whole or in part, as non-transitory computer readable mediums storing, at least in part, software and/or firmware.

Such software and/or firmware may include instructions which, when executed by the one or more processors (not shown) or other hardware (e.g. circuitry) of the central node (106), cause the one or more processors and/or other hardware components to perform operations in accordance with one or more embodiments described herein. These operations may at least include the method outlined in FIG. 7, below, which is directed to post-processing event timestamps.

Such software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

The central node (106) is described in further detail with respect to FIG. 3, below.

While FIG. 1 shows a configuration of components, other system (100) configurations may be used without departing from the scope of the disclosure. For example, in one or more embodiments of the disclosure, at least one of the detection nodes (102A-102N) may also be configured as the central node (106) (rather than the central node (106) being a separate physical entity apart from any of the detection nodes (102A-102N)). By way of another example, in one or more other embodiments of the disclosure, the aggregation of records on any number of the detection nodes (102A-102N) may occur in addition or alternative to the aggregation of records on the central node (106).

Figure 2:
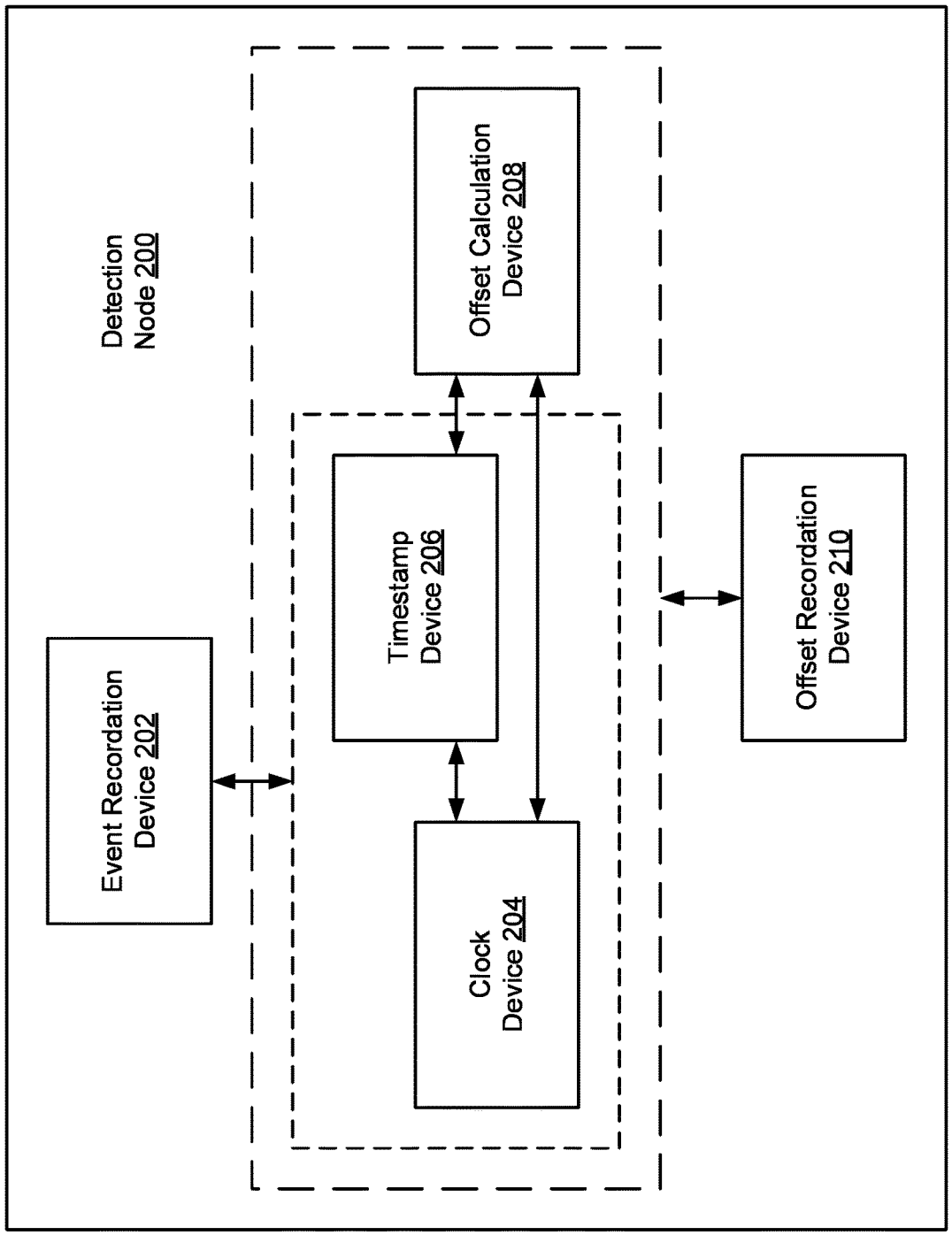
FIG. 2 shows a detection node in accordance with one or more embodiments of the disclosure.

FIG. 2 shows a detection node in accordance with one or more embodiments of the disclosure. The detection node (200) may include an event recordation device (202), a clock device (204), a timestamp device (206), an offset calculation device (208), and an offset recordation device (210). The clock device (204), the timestamp device (206), and the offset calculation device (208) may operatively connect to one another. Meanwhile, the event recordation device (202) may operatively connect to the clock device (204) and/or the timestamp device (206), whereas the offset recordation device (210) may operatively connect to the clock device (204), the timestamp device (206), and/or the offset calculation device (208). Each of these detection node (200) subcomponents is described below.

Figure 3:
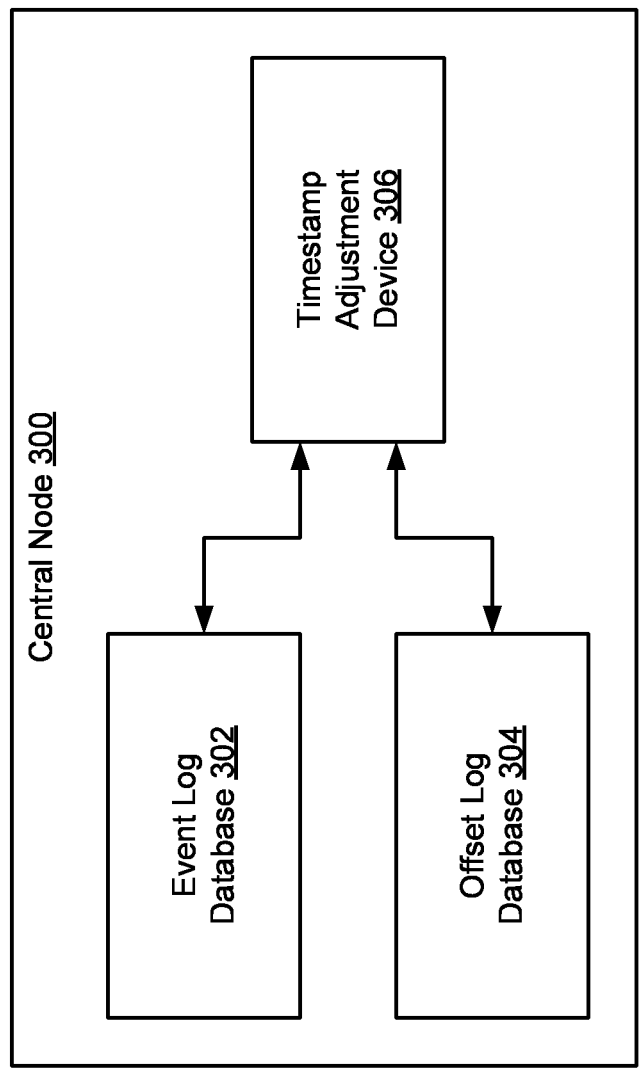
FIG. 3 shows a central node in accordance with one or more embodiments of the disclosure.
Figure 4B:
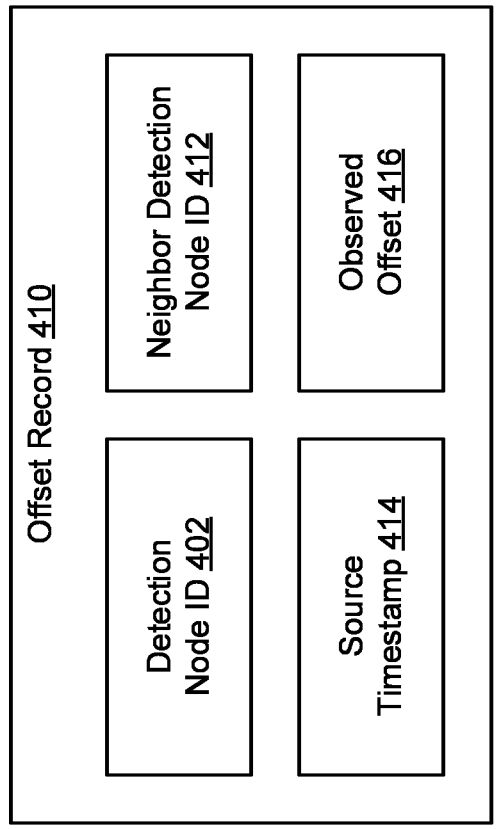
FIG. 4B shows an offset record in accordance with one or more embodiments of the disclosure.
Figure 4A:
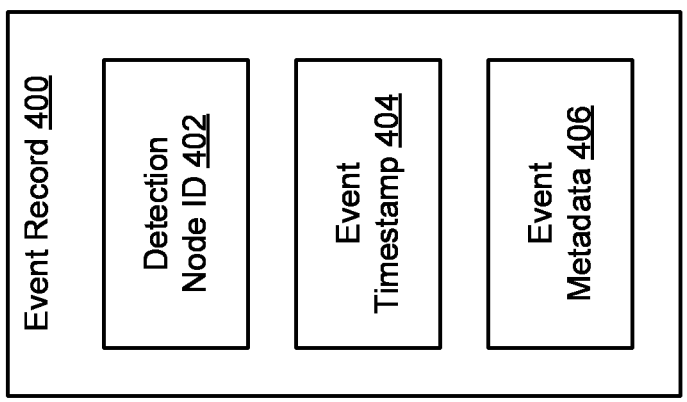
FIG. 4A shows an event record in accordance with one or more embodiments of the disclosure.

In one embodiment of the disclosure, the event recordation device (202) may refer to any hardware (e.g., circuitry), software, firmware, or any combination thereof, which includes functionality to create and submit event records (see e.g., FIG. 4A). To that extent, the event recordation device (202) may include functionality to interface with the clock device (204) and/or timestamp device (206), as well as other hardware and/or logical components (not shown) of the detection node (200), to aggregate information pertinent to event record generation. The aforementioned information may include, but is not limited to, a detection node identifier (ID) associated with the detection node (200), an event timestamp reflective of a date and/or time at or during which an event (described above) (see e.g., FIG. 1) had been detected by the detection node (200), and event metadata describing (or providing context to) the detected event. These pieces of information are described in further detail with respect to FIG. 4A, below. The event recordation device (202), furthermore, may include functionality to submit any created event records to an event log database on the central node (see e.g., FIG. 3) for consolidation.

In one embodiment of the disclosure, the clock device (204) may refer to any hardware component (or a set of hardware components) (e.g., including circuitry) configured for tracking time at any time scale. For example, such a hardware component may be and/or may include an oscillator that oscillates at a specific frequency (e.g., when electricity is applied). The frequency of such oscillations (e.g., clock speeds) may be the shortest period of time that a device may use as a clock cycle. Such frequencies may allow for any level of time accuracy, depending on the hardware component. For example, frequencies may be possible in the sub-nanosecond range (e.g., down to a femtosecond range). Though the aforementioned discusses the direct correlation of frequency to measurable time precision (e.g., higher frequencies lead to greater time precisions), one or more embodiments of the disclosure is/are not limited to said correlation for configuring the clock device (204) to track time at any time scale. That is, other relationships and/or techniques may be used for configuring the clock device (204) to track time without departing from the scope of the disclosure. Further, the clock device (204) may include additional hardware capable of measuring, at least in part, using the oscillator frequency, the amount of time that has passed from a certain time in the past. For example, time may be divided into epochs, which have a defined starting point, and a number of time units (e.g., nanoseconds) that have passed since the beginning of a given epoch, including possible adjustments (e.g., for leap seconds), which may be measured by the clock device (204).

In one embodiment of the disclosure, the timestamp device (206) may refer to any hardware (e.g., circuitry), software, firmware, or any combination thereof, which includes functionality to record timestamps. To that extent, the timestamp device (206) may include functionality to make a determination, using at least the clock device (204), of the current time relative to the beginning of an epoch. Further, the timestamp device (206) may include functionality to store timestamps in storage (not shown) of the detection node (200). Any timestamp may be recorded, for example, by storing a series of binary bits, where the series of binary bits may include any number of bits, with more bits representing the capability for storing more precise timestamps.

In one embodiment of the disclosure, the offset calculation device (208) may refer to any hardware (e.g., circuitry), software, firmware, or any combination thereof, which includes functionality to calculate a time offset (also referred to herein as an observed offset). A time offset, in turn, may refer to any discrepancy (in units of time—e.g., one or more nanoseconds) between the time that the detection node (200) has as the time and a time that another (i.e., neighbor) detection node has as the time. To perform such offset calculations, the offset calculation device (208) may use a set of timestamps generated based on the receipt of, or obtained from, an exchange of time protocol (e.g., PTP or NTP) message(s) between the detection node (200) and a neighbor detection node (not shown) of the detection node (200).

For example, based on an exchange of PTP messages and collected timestamps thereof, the offset calculation device (208) may derive a time offset by subtracting a timestamp of when a first PTP message arrived at the neighbor detection node from a timestamp of when the first PTP message departed from the detection node (200), and subtracting a timestamp of when a second PTP message arrived at the detection node (200) from a timestamp of when the second PTP message departed from the neighbor detection node. These two results are subtracted from one another, and the result may, for example, be divided by two, yielding a time offset. Below is an exemplary mathematical expression that conveys the aforementioned offset calculation process:

$$\text{offset} = \tfrac{1}{2}((XB-XA)-(YC-YD))$$

In the above mathematical expression, X is the first time protocol message, and was sent from the detection node (200) to the neighbor detection node. Y is the second time protocol message, and was sent from the neighbor detection node to the detection node (200). A is the timestamp of when the first time protocol message arrived at the neighbor detection node, and B is the timestamp of when the first time protocol message departed from the detection node (200). C is the timestamp of when the second time protocol message arrived at the detection node (200), and D is the timestamp of when the second time protocol message departed from the neighbor detection node.

In one embodiment of the disclosure, the offset recordation device (210) may refer to any hardware (e.g., circuitry), software, firmware, or any combination thereof, which includes functionality to create and submit offset records (see e.g., FIG. 4B). To that extent, the offset recordation device (210) may include functionality to interface with the clock device (204), the timestamp device (206), and/or the offset calculation device (208), as well as other hardware and/or logical components (not shown) of the detection node (200), to aggregate information pertinent to offset record generation. The aforementioned information may include, but is not limited to, a detection node identifier (ID) associated with the detection node (200), a neighbor detection node ID associated with a neighbor detection node (described above) (see e.g., FIG. 1) of the detection node (200), a source timestamp reflective of a date and/or time at or during which time protocol (e.g., PTP or NTP) message(s) had been exchanged between the detection node (200) and the neighbor detection node, and an observed (time) offset determined based on the exchange of time protocol message(s) and representative of any time discrepancy between clock devices on the detection node (200) and the neighbor detection node. These pieces of information are described in further detail with respect to FIG. 4B, below. The offset recordation device (210), furthermore, may include functionality to submit any created offset records to an offset log database on the central node (see e.g., FIG. 3) for consolidation.

While FIG. 2 shows a configuration of subcomponents, other detection node (200) configurations may be used without departing from the scope of the disclosure.

FIG. 3 shows a central node in accordance with one or more embodiments of the disclosure. The central node (300) may include an event log database (302), an offset log database (304), and a timestamp adjustment device (306). The timestamp adjustment device (306) may operatively connect to both the event log and offset log databases (302, 304). Each of these central node (300) subcomponents is described below.

In one embodiment of the disclosure, the event log database (302) may refer to data storage (e.g., a data repository) configured to store and index a collection of event records (not shown) (see e.g., FIG. 4A). Each given event record may include information pertinent to a given event (described above) (see e.g., FIG. 1), which may have been detected by a given detection node. Further, the event log database (302) may be implemented on physical, persistent (i.e., non-volatile) storage that may reside on the central node (300). Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the disclosure, the offset log database (304) may refer to data storage (e.g., a data repository) configured to store and index a collection of offset records (not shown) (see e.g., FIG. 4B). Each given offset record may include information pertinent to a given exchange of time protocol (e.g., PTP or NTP) message(s) between a given detection node and a given neighbor detection node of the given detection node, which may have been conducted for the purposes of clock offset determination there-between. Further, the offset log database (304) may be implemented on physical, persistent (i.e., non-volatile) storage that may reside on the central node (300). Examples of persistent storage may include, but are not limited to, optical storage, magnetic storage, NAND Flash Memory, NOR Flash Memory, Magnetic Random Access Memory (M-RAM), Spin Torque Magnetic RAM (ST- MRAM), Phase Change Memory (PCM), or any other storage defined as non-volatile Storage Class Memory (SCM).

In one embodiment of the disclosure, the timestamp adjustment device (306) may refer to any hardware (e.g., circuitry), software, firmware, or any combination thereof, which includes functionality to access and process event records from the event log database (302) and/or offset records from the offset log database (304), and perform actions relevant to time synchronization directed to any subset of the collection or network of detection nodes (not shown) (see e.g., FIG. 1) based on the results of said processing. To that extent, the timestamp adjustment device (306) may include functionality to at least perform the method outlined in FIG. 7, below, which is directed to post-processing event timestamps. One of ordinary skill, however, will appreciate that the timestamp adjustment device (306) may perform other functionalities without departing from the scope of the disclosure.

While FIG. 3 shows a configuration of subcomponents, other central node (300) configurations may be used without departing from the scope of the disclosure.

FIG. 4A shows an event record in accordance with one or more embodiments of the disclosure. An event record (400) may refer to a data object (e.g., a data file), a data structure, or any other data container, wherein information pertinent to a given event, detected by a given detection node, may be stored and accessed. The aforementioned information may include, but is not limited to, a detection node identifier (ID) (402), an event timestamp (404), and event metadata (406). Each of these pieces of information is described below.

In one embodiment of the disclosure, the detection node ID (402) may, for example, refer to any arbitrary-length character string (e.g., letters, numbers, symbols, or any combination thereof) that serves to uniquely identify the given detection node. The detection node ID (402) may further serve to distinguish the given detection node from other detection nodes.

In one embodiment of the disclosure, the event timestamp (404) may, for example, refer to any arbitrary-length series of binary bits (e.g., where more bits correlate to more precision) representative of a given time at which the given event had been detected by the given detection node. Accordingly, the given time, and thus the event timestamp (404), may have been derived from a clock device and/or a timestamp device (see e.g., FIG. 2) residing on the given detection node.

In one embodiment of the disclosure, event metadata (406) may refer information that describes (or provides context to) the given event. By way of examples, event metadata (406) may include, but is not limited to, one or more characteristics descriptive of received network traffic (e.g., packet length in bytes, whether the packet is well-formed or malformed, etc.), a sequence number associated with the given event, and identification information identifying which sensor or port of the given detection node detected the given event.

While FIG. 4A shows a configuration of information, other event record (400) configurations may be used without departing from the scope of the disclosure.

FIG. 4B shows an offset record in accordance with one or more embodiments of the disclosure. An offset record (410) may refer to a data object (e.g., a data file), a data structure, or any other data container, wherein information pertinent to a given exchange of time protocol (e.g., PTP or NTP) message(s) between a given detection node and a given neighbor detection node of the given detection node, which may have been conducted for the purposes of clock offset determination there-between, may be stored and accessed. The aforementioned information may include, but is not limited to, a detection node identifier (ID) (402), a neighbor detection node ID (412), a source timestamp (414), and an observed offset (416). Each of these pieces of information is described below.

In one embodiment of the disclosure, the detection node ID (402) may, for example, refer to any arbitrary-length character string (e.g., letters, numbers, symbols, or any combination thereof) that serves to uniquely identify the given detection node. The detection node ID (402) may further serve to distinguish the given detection node from other detection nodes (e.g., the given neighbor detection node).

In one embodiment of the disclosure, the neighbor detection node ID (412) may, for example, refer to any arbitrary-length character string (e.g., letters, numbers, symbols, or any combination thereof) that serves to uniquely identify the given neighbor detection node. The neighbor detection node ID (412) may further serve to distinguish the given neighbor detection node from other detection nodes (e.g., the given detection node).

In one embodiment of the disclosure, the source timestamp (414) may, for example, refer to any arbitrary-length series of binary bits (e.g., where more bits correlate to more precision) representative of a given time at or during which the given exchange of time protocol message(s) had departed from and/or had been received by the given detection node. Accordingly, the given time, and thus the source timestamp (414), may have been derived from a clock device and/or a timestamp device (see e.g., FIG. 2) residing on the given detection node.

In one embodiment of the disclosure, the observed offset (416) (also referred to as offset or time offset) may, for example, refer to any arbitrary-length series of binary bits representative of a difference in time units (e.g., nanoseconds) between the source timestamp (414) and timestamp(s) reflective of the given exchange of time protocol message(s), which had been received by and/or had departed from the given neighbor detection node. The calculation of the observed offset (416) is described in further detail with respect to FIG. 2, above.

While FIG. 4B shows a configuration of information, other offset record (410) configurations may be used without departing from the scope of the disclosure.

Figure 5:
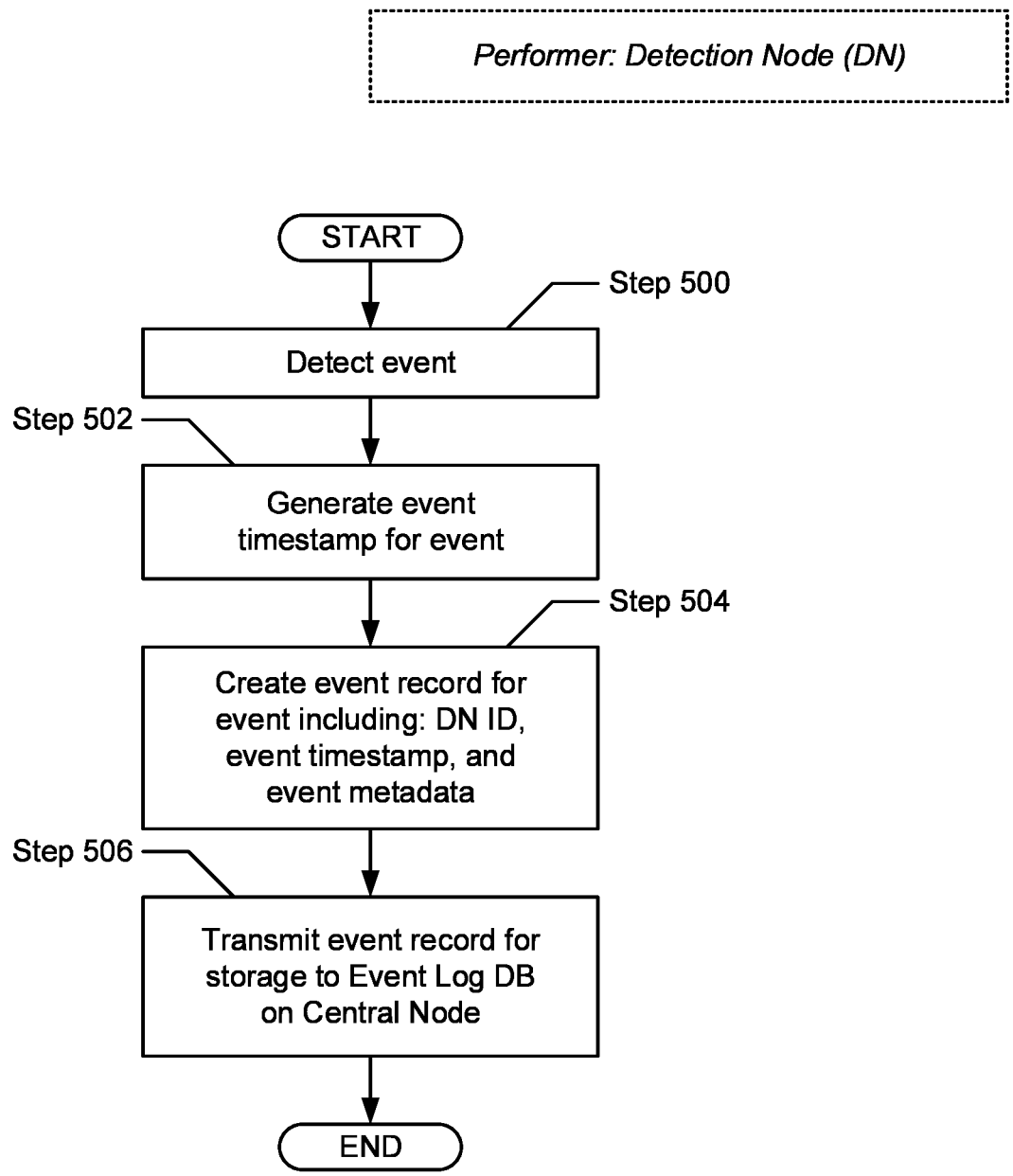
FIG. 5 shows a flowchart describing a method for logging events in accordance with one or more embodiments of the disclosure.

FIG. 5 shows a flowchart describing a method for logging events in accordance with one or more embodiments of the disclosure. The various steps outlined below may be performed by any detection node (see e.g., FIGS. 1 and 2). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, an event is detected. In one embodiment of the disclosure, the event may encompass any occurrence that the detection node may be configured to detect. Further, the event may have transpired on the detection node or, alternatively, may have transpired within an environment outside, yet spatially proximal to, the detection node. Examples of the former may include, but are not limited to, the arrival of network traffic data through any physical interface of the detection node, the arrival of a time pulse or pulse per second (PPS) signal through any physical interface of the detection node, the generation of log messages arising from software processes (e.g., error conditions, user logins, etc.) occurring on the detection node, the arrival or departure of clock synchronization samples through any physical interface of the detection node, the reading of counters (e.g., for packet classification) occurring on the detection node, the recording of configuration updates applied to the detection node, and the recording of on-board telemetry information (e.g., fan speed, temperatures, etc.) describing a state of the detection node. On the other hand, examples of the latter may include, but are not limited to, the change in any monitored property (e.g., temperature, pressure, luminosity, etc.) reflective of the outside environment from hardware sensors connected to a detection node.

In Step 502, an event timestamp is generated for the event (detected in Step 500). In one embodiment of the disclosure, the event timestamp may specify a given date and/or time, based on a clock device and/or timestamp device of the detection node, at or during which the event had been detected. Further, the event timestamp may be implemented, for example, through any arbitrary-length series of binary bits, with more bits representing a more precise timestamp.

In Step 504, an event record is created for the event (detected in Step 500). In one embodiment of the disclosure, the event record may refer to a data object (e.g., a data file), a data structure, or any other data container, wherein information pertinent to the event may be stored and accessed. The aforementioned information may include, but is not limited to, a detection node identifier (ID) associated with the detection node, the event timestamp (generated in Step 502), and event metadata describing (or providing context to) the event. The event record is described in further detail with respect to FIG. 4A, above.

In Step 506, the event record (created in Step 504) is transmitted to the central node (see e.g., FIG. 3), for consolidation within the event log database thereon.

Figure 6:
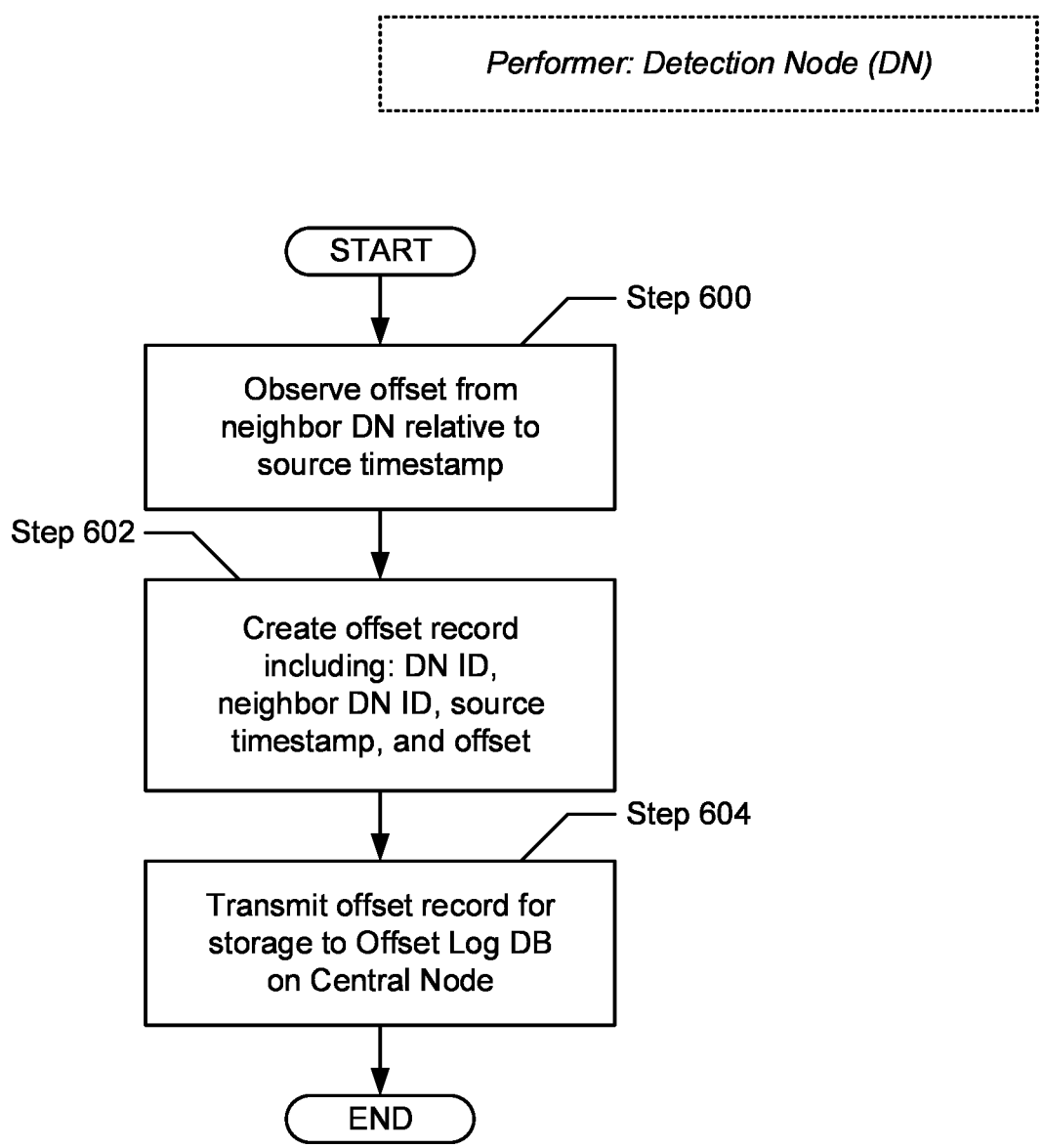
FIG. 6 shows a flowchart describing a method for logging offset observations in accordance with one or more embodiments of the disclosure.

FIG. 6 shows a flowchart describing a method for logging offset observations in accordance with one or more embodiments of the disclosure. The various steps outlined below may be performed by any detection node (see e.g., FIGS. 1 and 2). Further, while the various steps in the flowchart are presented and described sequentially, one of ordinary skill will appreciate that some or all steps may be executed in different orders, may be combined or omitted, and some or all steps may be executed in parallel.

Turning to FIG. 6, in Step 600, an offset (or time offset) is observed. In one embodiment of the disclosure, the offset (or calculation thereof) may follow a given exchange of time protocol (e.g., PTP or NTP) message(s) between the detection node and a neighbor detection node of the detection node. Briefly, the offset may be derived based on timestamps, recorded for the exchanged time protocol message(s), which are reflective of when the exchanged time protocol message(s) departed from and/or arrived at the detection node and the neighbor detection node. Offset calculation is described in further detail with respect to FIG. 2, above. Further, the observed offset may be implemented, for example, as any arbitrary-length series of binary bits representative of a difference in time units (e.g., nanoseconds) relative to a source timestamp (described above) (see e.g., FIG. 4B).

In Step 602, an offset record is created for the offset (observed in Step 600). In one embodiment of the disclosure, may refer to a data object (e.g., a data file), a data structure, or any other data container, wherein information pertinent to a given exchange of time protocol (e.g., PTP or NTP) message(s) between the detection node and a given neighbor detection node of the detection node, which may have been conducted for the purposes of clock offset determination there-between, may be stored and accessed. The aforementioned information may include, but is not limited to, a detection node identifier (ID) associated with the detection node, a neighbor detection node ID associated with the given neighbor detection node, the source timestamp, and the offset (observed in Step 600). The offset record is described in further detail with respect to FIG. 4B, above.

In Step 604, the offset record (created in Step 602) is transmitted to the central node (see e.g., FIG. 3), for consolidation within the offset log database thereon.

Figure 7:
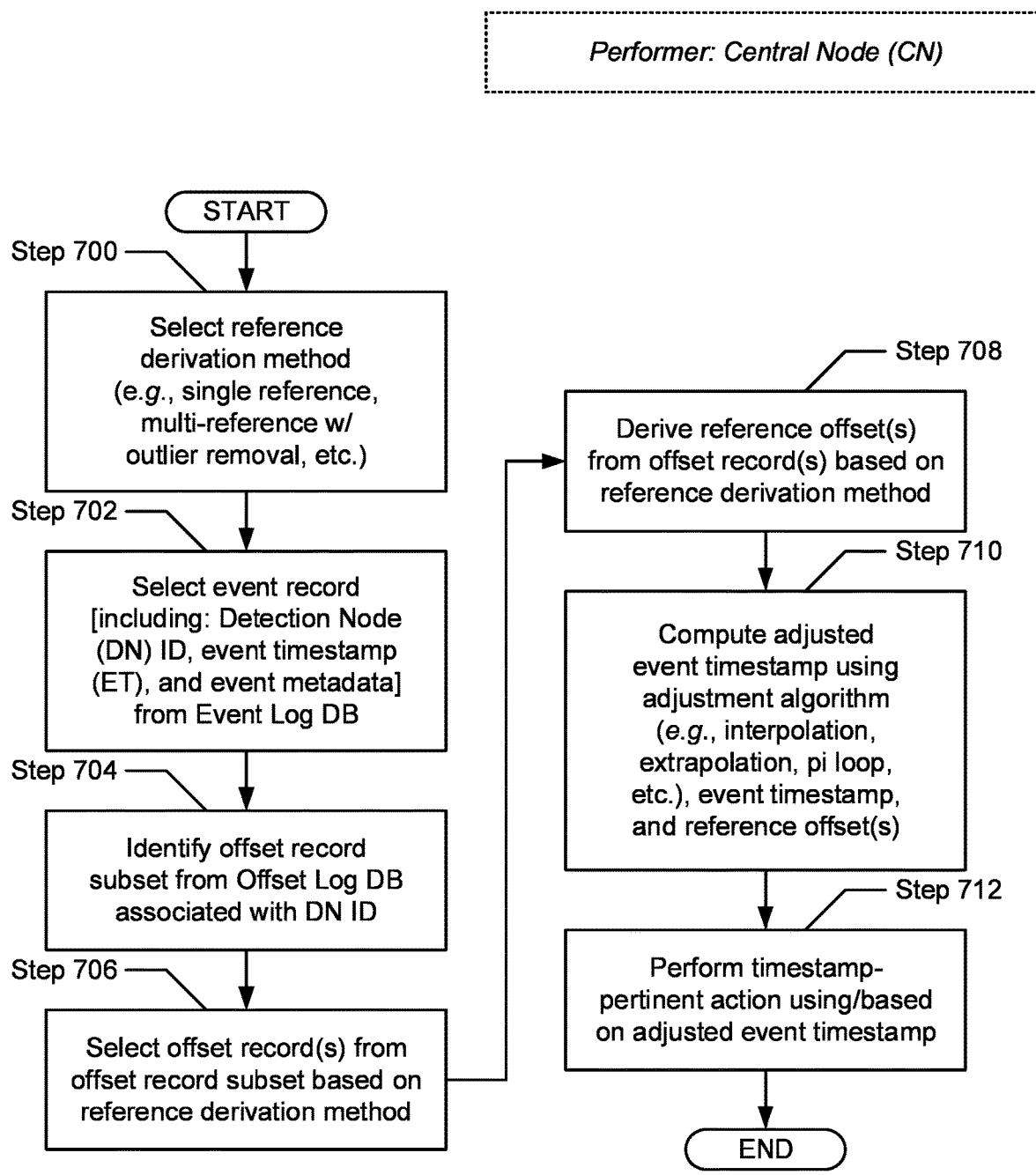
FIG. 7 shows a flowchart describing a method for post-processing event timestamps in accordance with one or more embodiments of the disclosure.

FIG. 7 shows a flowchart describing a method for post-processing event timestamps in accordance with one or more embodiments of the disclosure. The various steps outlined below may be performed by the central node (see e.g., FIGS. 1 and 3). Further, while the various steps in the flowchart are presented and described sequentially, one of ordinary skill will appreciate that some or all steps may be executed in different orders, may be combined or omitted, and some or all steps may be executed in parallel.

Turning to FIG. 7, in Step 700, a reference derivation method is selected. In one embodiment of the disclosure, the reference derivation method may refer to an algorithm through which one or more reference offsets may be derived. A reference offset may encompass an offset (i.e., a time offset) observed from a time-reliable source or reference (e.g., a clock device). Similarly, a set of reference offsets may encompass a set of offsets observed from a set of time-reliable sources or references (e.g., a set of clock devices).

In one embodiment of the disclosure, the reference derivation method may rely on a single clock device. The clock device may pertain to and/or may reside on a detection node, a neighbor detection node of the detection node, or any locally or globally accessible device synched to a worldwide time system, such as the Coordinated Universal Time (UTC). By way of an example, a determination or selection of which single clock device (belonging to which single device) to rely upon may entail an evaluation of a network state, of the collection or network of detection nodes, at or during a time indicated by an event timestamp (see e.g., FIG. 4A). Specifically, any device(s) that had experienced maintenance downtime or failure at or during the time indicated by the event timestamp may be removed from consideration, whereas, conversely, any device(s) that had experienced an uptime at or during the time indicated by the event timestamp may be considered as viable candidate(s). Further, should more than one device be considered, a selection of a single device from the two or more devices may entail the application of one or more selection criteria (e.g., randomization, ranking by a known quality and/or physical details of the clock devices, a stratum or distance of the clock devices from a known accurate time source such as a global positioning system (GPS), a health of the devices on which the clock devices reside, any information learned after the fact such as a determination that a node had been faulty, information indicating which clock devices may be disciplined or synchronized to known "golden" external sources such as a GPS, any existing clock selection algorithms such as those used in Best Master Clock Algorithm (BCMA) or NTP, and any number of other dynamic and/or static considerations, such as clock stability, history, time sync source, communication link state, etc.).

Further, in one embodiment of the disclosure, if the above-mentioned single clock device pertains to and/or resides on a given detection node that detected an event currently being processed, the reference offset—i.e., a difference in time, measured in any time unit (e.g., one or more nanoseconds), between the clock device of the given detection node and the single clock device—may reflect a zero value. In another embodiment of the disclosure, if the above-mentioned single clock device pertains to and/or resides on a neighbor detection node of a given detection node that detected an event currently being processed, or pertains to and/or resides on any other device, the reference offset—i.e., a difference in time, measured in any time unit (e.g., one or more nanoseconds), between the clock device of the given detection node and the single clock device—may reflect a non-zero value.

In one embodiment of the disclosure, the reference derivation method may alternatively rely on a set of (i.e., two or more) clock devices. Each clock device may pertain to and/or may reside on a detection node, a neighbor detection node of the detection node, or any locally or globally accessible device synched to a worldwide time system, such as the Coordinated Universal Time (UTC). By way of an example, a determination or selection of which two or more clock devices (belonging to which two or more devices) to rely upon may again entail an evaluation of a network state, of the collection or network of detection nodes, at or during a time indicated by an event timestamp (see e.g., FIG. 4A). A narrowing down of which clock devices to rely upon may also entail analyses applied to the various offsets observed from the various clock devices, such as outlier removal to retain those clock devices that observed offsets, respectively, within a specified threshold to a baseline (e.g., average, median, etc.) offset representative of the observed offsets.

In Step 702, an event record is selected from the event log database of the central node (see e.g., FIG. 3). In one embodiment of the disclosure, selection of the event record may result from the initiation of a scheduled job directed to processing the event record, by the central node. In another embodiment of the disclosure, selection of the event record may result from the receipt of an on-demand request, to process the event record, which may have been submitted to the central node by a network administrator. Further, the event record may refer to a data object (e.g., a data file), a data structure, or any other data container, wherein information pertinent to an event, which had been detected by a given detection node, may be stored and accessed. The aforementioned information may include, but is not limited to, a detection node identifier (ID) associated with the given detection node, an event timestamp indicating a time at or during which the event had been detected (based on a clock device of the given detection node), and event metadata describing (or providing context to) the event (all described above) (see e.g., FIG. 4A).

In Step 704, an offset record subset is identified from the offset log database of the central node (see e.g., FIG. 3). In one embodiment of the disclosure, the offset record subset may encompass a collection of offset records (see e.g., FIG. 4B)— each of which may include or specify a detection node ID that matches the detection node ID included or specified in the event record (selected in Step 702).

In Step 706, based on the reference derivation method (selected in Step 700), one or many offset records is/are selected from the offset record subset (identified in Step 704). That is, in one embodiment of the disclosure, if the reference derivation method relies on a single clock device, a single offset record may be selected, where the single offset record includes or specifies a source timestamp (described above) (see e.g., FIG. 4B) most proximal, if not equal, to the event timestamp included or specified in the event record (selected in Step 702). In another embodiment of the disclosure, if the reference derivation method relies on multiple clock devices, multiple offset records may be selected, where each offset record of the multiple selected offset records includes or specifies a source timestamp within a specified range or threshold of the event timestamp included or specified in the event record (selected in Step 702).

In Step 708, based on the reference derivation method (selected in Step 700), one or many reference offsets (described above) is/are derived from the offset record(s) (selected in Step 706). That is, in one embodiment of the disclosure, if the reference derivation method relies on a single clock device, a single reference offset may be derived from the single offset record (selected in Step 706). More specifically, the observed offset (see e.g., FIG. 4B) included or specified in the selected single offset record may translate into the single reference offset. Alternatively, in another embodiment of the disclosure, if the reference derivation method relies on multiple clock devices, multiple reference offsets may be derived from the multiple offset records (selected in Step 706). Particularly, the observed offset included or specified in each offset record, of the selected multiple offset records, may translate into a reference offset, of the multiple reference offsets.

In Step 710, an adjusted event timestamp is computed. In one embodiment of the disclosure, the adjusted event timestamp is the event timestamp (specified in the event record selected in Step 702) corrected to be consistent, or in alignment, with time measured by one or many time-reliable source(s) or reference(s) (based on the reference derivation method (selected in Step 700)). That is, as an expression (below), the adjusted event timestamp equates to a summation of the event timestamp with a time correction or adjustment implemented through an observed offset that corresponds to the event timestamp.

However, because no actual observed offset, corresponding to the event timestamp, was ever recorded—e.g., the event record does not include an observed offset as information pertinent to the given event—the aforementioned observed offset must be estimated from one or more points of reference (e.g., the one or more reference offsets (derived in Step 708), along with their corresponding reference (i.e., source) timestamps). Accordingly, computation of the observed offset, corresponding to the event timestamp, and therefore the adjusted event timestamp, may entail the application of an adjustment algorithm. The adjustment algorithm may be implemented through any existing data estimation method—examples of which may include, but are not limited to, any variation (e.g., linear, polynomial, spline, etc.) of data interpolation, any variation (e.g., linear, polynomial, conic, etc.) of data extrapolation, and proportional-integral (PI) control loops.

By way of an example, the linear interpolation based computation of the adjusted event timestamp may be represented through the following expressions, which, at least in this example, relies upon two points of reference:

$$AET = ET + O_{ET},$$

$$O_{ET} = O_B + (ET - T_B) \cdot \frac{O_A - O_B}{T_A - T_B}$$

In the above expressions, AET is the adjusted event timestamp. ET is the event timestamp (specified in the event record selected in Step 702). $O_{ET}$ is the observed offset that corresponds to the event timestamp, which is being estimated. $O_B$ is a first reference offset (which may have been derived in Step 708), which along with a corresponding first reference timestamp, encompasses a first point of reference of the relied upon two points of reference. TB is the aforementioned first reference timestamp, which is representative of the source timestamp (specified in an offset record selected in Step 706) from which the first reference offset is derived, where the first reference timestamp indicates a time positioned chronologically before (B) another time indicated by the event timestamp. $O_A$ is a second reference offset (which may have been derived in Step 708), which along with a corresponding second reference timestamp, encompasses a second point of reference of the relied upon two points of reference. Lastly, $T_A$ is the aforementioned second reference timestamp, which is representative of the source timestamp (specified in an offset record selected in Step 706) from which the second reference offset is derived, where the second reference timestamp indicates a time positioned chronologically after (A) the other time indicated by the event timestamp.

In Step 712, using or based on the adjusted event timestamp (computed in Step 710), a timestamp-pertinent action is performed. In one embodiment of the disclosure, the timestamp-pertinent action may entail disciplining (or adjusting) a clock device on the given detection node (associated with the event record selected in Step 702) based on the adjusted event timestamp. Specifically, the adjusted event timestamp may be used to adjust the frequency of the aforementioned clock device such that the clock device aligns with the time-reliable source(s)/reference(s) over time. In another embodiment of the disclosure, the time-pertinent action may alternatively entail interpreting the event, associated with the event record (selected in Step 702), using the adjusted event timestamp. In this regard, the adjusted event timestamp may be used the assess the event in view of the corrected timestamp; and, subsequently, may also entail the recordation of the adjusted event timestamp (e.g., via replacement of the event timestamp) in the event record. Other timestamp-pertinent actions may be performed without departing from the scope of the disclosure.

Figure 8:
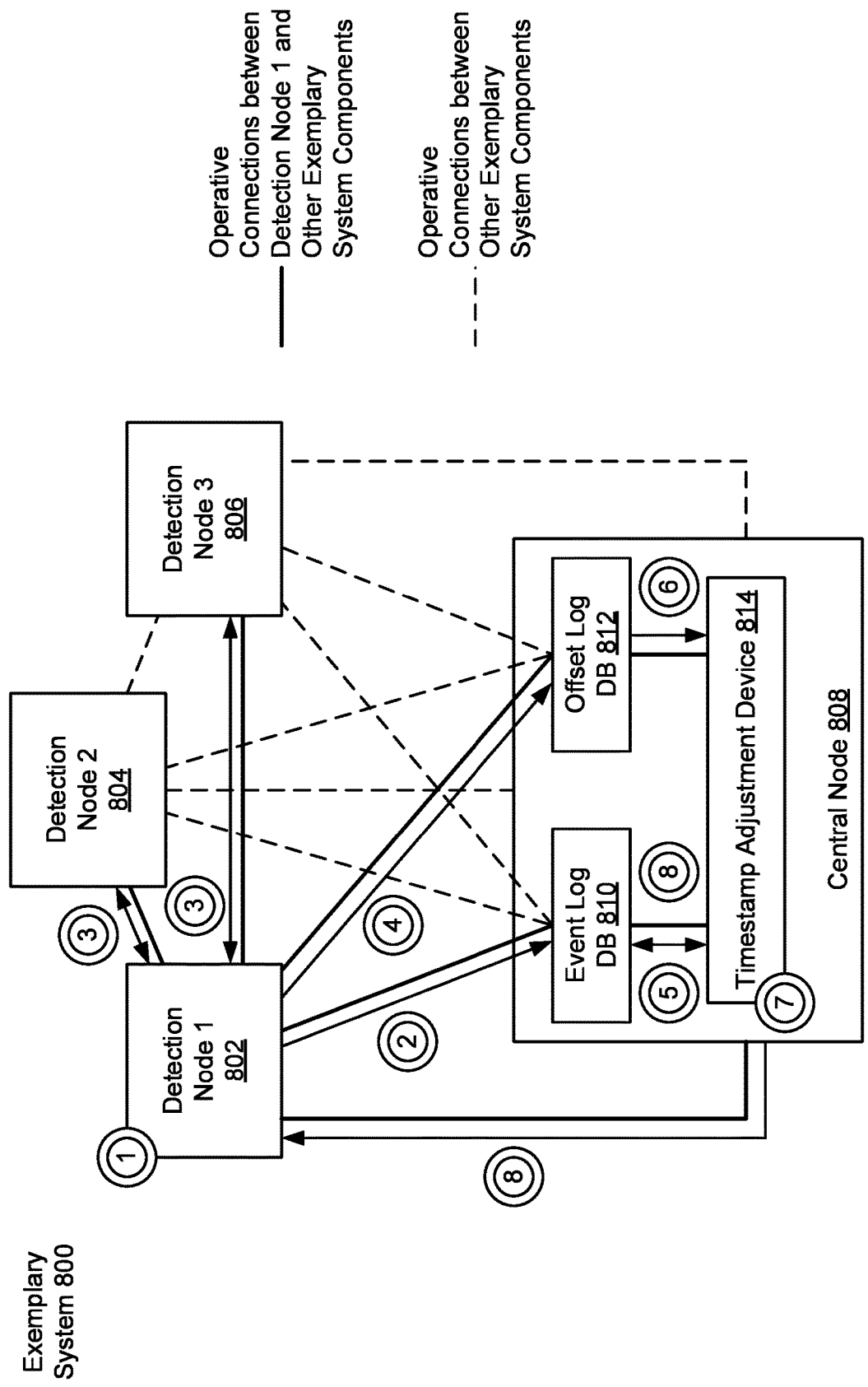
FIG. 8 shows an exemplary scenario in accordance with one or more embodiments of the disclosure.

FIG. 8 shows an exemplary scenario in accordance with one or more embodiments of the disclosure. The exemplary scenario, illustrated through FIG. 8 and described below, is for explanatory purposes only and not intended to limit the scope of the disclosure.

Turning to FIG. 8, consider an exemplary system (800) that includes three detection nodes—i.e., Detection Node 1 (802), Detection Node 2 (804), and Detection Node 3 (806)—that operatively connect to one another, as well as a Central Node (808). The Central Node (808), in turn, includes an Event Log Database (DB) (810), an Offset Log DB (812), and a Timestamp Adjustment Device (814). Using the aforementioned exemplary system (800), the virtual time synchronization of events, in accordance with one or more embodiments of the disclosure, may be implemented as follows:

1) Detection Node 1 (802) generates event record(s) (see e.g., FIG. 4A) for event(s) detected thereby, where each event record specifies a Detection Node 1 (802) ID, an event timestamp (derived from a Detection Node 1 (802) clock device) for a given event, and event metadata descriptive of the given event
2) Detection Node 1 (802) transmits the generated event record(s) to the Event Log DB (810) of the Central Node (808) for consolidation
3) Prior to, in parallel to, and/or following the detection of event(s), Detection Node 1 (802) periodically communicates with its neighbor detection nodes—i.e., Detection Node 2 (804) and Detection Node 3 (806)—through the exchange of time protocol (e.g., PTP or NTP) messages, thereby obtaining offset observation(s) relative to source timestamp(s) (derived from the Detection Node 1 (802) clock device); Detection Node 1 (802) accordingly generates offset record(s) (see e.g., FIG. 4B), where each offset record specifies the Detection Node 1 (802), a neighbor detection node ID, the source timestamp, and an offset observation (i.e., observed offset); [Note: throughout the timeline, Detection Node 2 (804) also periodically communicates with its neighbor detection nodes—i.e., Detection Node 1 (802) and Detection Node 3 (806)—through the exchange of time protocol messages to obtain offset observation(s) relative to source timestamp(s) (derived from a Detection Node 2 (804) clock device); and, likewise, Detection Node 3 (806) periodically communicates with its neighbor detection nodes—i.e., Detection Node 1 (802) and Detection Node 2 (804)—through the exchange of time protocol messages to obtain offset observation(s) relative to source timestamp(s) (derived from a Detection Node 3 (806) clock device)]
4) Detection Node 1 (802) transmits the generated offset record(s) to the Offset Log DB (812) of the Central Node (808) for consolidation
5) At some time afterwards, the Central Node (808) (or more specifically, the Timestamp Adjustment Device (814) thereon) selects an event record from the Event Log DB (810); the selected event record is a submission from Detection Node 1 (802)
6) The Central Node (808) subsequently identifies an offset record subset from the Offset Log DB (812), where each offset record of the offset record subset specifies the Detection Node 1 (802) ID included in the selected event record; thereafter, based on a pre-selected reference derivation method, the Central Node (808) selects one or many offset record(s) from the identified offset record subset
7) Using information (e.g., observed offset and source timestamp) specified in the selected one or many offset record(s), and based on the pre-selected reference derivation method, the Central Node (808) derives one or many reference offset(s) (as well as their corresponding one or many reference timestamp(s)); further, through a pre-selected adjustment algorithm, along with the derived one or many reference offset(s) and/or one or many reference timestamp(s), the Central Node (808) computes an adjusted event timestamp reflective of a more reliable time at or during which the given event transpired
8) The Central Node (808) thereafter performs timestamp-pertinent action(s) (e.g., disciplining the Detection Node 1 (802) clock device and/or interpreting the given event) using/based on the computed adjusted event timestamp In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While a limited number of embodiments have been described herein, those skilled in the art, having benefit of this disclosure, will appreciate that other embodiments can be devised which do not depart from the scope of the embodiments disclosed herein. Accordingly, the scope of the disclosure should be limited only by the attached claims.

What is claimed is:

1. A central node configured to receive information from a plurality of detection nodes, the central node comprising:
   storage that stores offset records, obtained from the plurality of detection nodes, in an offset log database, wherein each of the offset records includes a detection node identifier and an associated time offset; and
   one or more processors configured to
      obtain an event record for an event that includes an event timestamp and a given detection node identifier of a given detection node in the plurality of detection nodes that detected the event,
      obtain one or more reference offsets from the offset records based on the given detection node identifier and based on the event timestamp, and
      generate an adjusted version of the event timestamp based on the one or more reference offsets.

2. The central node defined in claim 1, wherein the one or more processors are configured to obtain the one or more reference offsets from a subset of the offset records that includes the given detection node identifier.

3. The central node defined in claim 2, wherein the one or more processors are configured to obtain the one or more reference offsets from one or more offset records of the subset of the offset records based on the event timestamp.

4. The central node defined in claim 3, wherein each of the offset records includes a source timestamp and wherein the one or more offset records of the subset of the offset records have one or more corresponding source timestamps that are most proximal, of the source timestamps in the subset of the offset records, to the event timestamp.

5. The central node defined in claim 4, wherein the one or more time offsets in the one or more offset records of the subset of the offset records are translated into the one or more reference offsets.

6. The central node defined in claim 1, wherein the one or more processors are configured to obtain a single reference offset, with respect to a single clock device, as the one or more reference offsets from a given offset record in the offset records based on the given detection node identifier and based on the event timestamp.

7. The central node defined in claim 6, wherein the detection node identifier of the given offset record identifies the given detection node and wherein the given offset record contains a neighbor detection node identifier that identifies a neighbor detection node containing the single clock device.

8. The central node defined in claim 1, wherein the one or more processors are configured to obtain at least two reference offsets, with respect to first and second clock devices, as the one or more reference offsets from first and second offset records in the offset records based on the given detection node identifier and based on the event timestamp.

9. The central node defined in claim 8, wherein the detection node identifier of the first offset record identifies the given detection node, wherein the first offset record contains a neighbor detection node identifier that identifies a neighbor detection node containing the first clock device, wherein the detection node identifier of the second offset record identifies the given detection node, and wherein the second offset record contains a neighbor detection node identifier that identifies a neighbor detection node containing the second clock device.

10. The central node defined in claim 1, wherein the one or more reference offsets are associated with one or more corresponding timestamps different from the event timestamp.

11. The central node defined in claim 10, wherein the one or more processors are configured to generate the adjusted version of the event timestamp by estimating an offset at the event timestamp using the one or more reference offsets and using the one or more corresponding timestamps different from the event timestamp.

12. The central node defined in claim 1, wherein the one or more processors are configured to perform a timestamp-pertinent action based on the adjusted version of the event timestamp.

13. The central node defined in claim 12, wherein the timestamp-pertinent action comprises disciplining, based on the adjusted version of the event timestamp, a clock device on the given detection node.

14. The central node defined in claim 12, wherein the timestamp-pertinent action comprises interpreting the event using the adjusted version of the event timestamp.

15. A method of operating a central node to process an event record for an event detected at a detection node, the method comprising:

receiving, by the central node and from the detection node, the event record, wherein the event record contains an event timestamp;

receiving, by the central node and from the detection node, a plurality of offset records, each offset record identifying the detection node and a neighbor node, containing a timestamp associated with the offset record, and containing a time offset relative to the neighbor node;

adjusting, by the central node, the event timestamp using the time offset in a given offset record of the plurality of offset records identified based on the timestamp of the given offset record and the event timestamp; and performing, by the central node, a timestamp-pertinent action based on the adjusted event timestamp.

16. The method defined in claim 15, wherein the timestamp of the given offset record differs from the event timestamp.

17. The method defined in claim 16, wherein the given offset record is identified based on proximity in time of the timestamp of the given offset record to the event timestamp.

18. The method defined in claim 15, wherein adjusting, by the central node, the event timestamp further uses the time offset in an additional offset record of the plurality of offset records identified based on the timestamp of the additional offset record and the event timestamp.

19. A method of operating a detection node in a system having a neighbor node and a central node coupled to the detection node and the neighbor node, the method comprising:

transmitting, by the detection node, an event record to the central node, the event record containing an identifier of the detection node and an event timestamp;

performing, by the detection node, communication with the neighbor node to obtain a time offset relative to the neighbor node;

transmitting, by the detection node, an offset record to the central node, the offset record containing the identifier of the detection node, an identifier of the neighbor node, a timestamp associated with the offset record, and the time offset; and receiving, by the detection node and from the central node, an indication to perform time synchronization based on an adjustment to the event timestamp by the central node using the offset record.

20. The method defined in claim 19 further comprising:

generating, by the detection node, the event timestamp and the timestamp associated with the offset record at least in part by using a clock device of the detection node, wherein the event timestamp differs in time from the timestamp associated with the offset record and wherein the indication to perform the time synchronization comprises an indication to discipline the clock device.

* * * * *